United States Patent [19]

Revankar

[11] Patent Number: 5,288,353

[45] Date of Patent: Feb. 22, 1994

[54] METHOD FOR FORMING A POLYMERIC PLASTIC PRODUCT HAVING A HARD WEAR-RESISTANT SURFACE

[75] Inventor: Gopal S. Revankar, Moline, Ill.

[73] Assignee: Deere & Company, Moline, Ill.

[21] Appl. No.: 822,905

[22] Filed: Jan. 21, 1992

[51] Int. Cl.$^5$ .............................................. B32B 19/02
[52] U.S. Cl. ................................. 156/153; 156/154; 156/230; 156/242; 156/245; 156/247; 156/249; 156/276; 156/279
[58] Field of Search ............... 156/242, 245, 276, 279, 156/153, 154, 230, 247, 249

[56] References Cited

U.S. PATENT DOCUMENTS

| | | | |
|---|---|---|---|
| 2,165,955 | 7/1939 | Haarhoff | 156/279 |
| 2,961,029 | 11/1960 | Rainar | 156/242 |
| 2,975,488 | 3/1961 | Brauner | 156/242 |
| 3,121,642 | 2/1964 | Biskup | 156/279 |
| 3,194,859 | 7/1965 | Wacker | 156/242 |
| 3,323,935 | 6/1967 | Snyder | 156/279 |
| 3,328,231 | 6/1967 | Sergovic | 156/242 |
| 4,119,459 | 10/1978 | Ekemar et al. | 75/243 |
| 4,923,550 | 5/1990 | Kramer | 156/279 |
| 5,027,878 | 7/1991 | Revankar et al. | 164/98 |

FOREIGN PATENT DOCUMENTS

| | | |
|---|---|---|
| 0037536 | 10/1981 | European Pat. Off. . |
| 0470503 | 2/1992 | European Pat. Off. . |
| 2011028 | 7/1979 | United Kingdom . |

OTHER PUBLICATIONS

"Application of Cast-On Ferrochrome-Based Hard Surfacings to Polystyrene Pattern Castings", Bureau of Mines Report of Investigations 8942, U.S. Dept. of Interior (1985), Hansen et al.

*Primary Examiner*—Caleb Weston
*Attorney, Agent, or Firm*—Burns, Doane, Swecker & Mathis

[57] ABSTRACT

A method for impregnating a plastic product with a hard wear-resistant material surface layer comprises providing a support plate having a desired shape and further having an adhesive layer on at least a portion thereof; introducing a plurality of particles comprising a hard wear-resistant material onto the adhesive layer; curing the adhesive so as to anchor the particles onto the support plate; placing the support plate into a mold cavity; introducing a polymer material into the cavity; exposing the sheet and polymer material to conditions effective to provide a polymer product having a hard wear-resistant material surface layer therein; cooling the mold and removing the support sheet therefrom. In a preferred embodiment, a regular pattern of particles is provided by providing a mesh plate having a desired pattern of holes set for predetermined size of wear-resistant particles; spreading the particles onto the mesh plate so as to provide a particle in substantially all of the holes; and transferring the pattern of particles onto the adhesive layer so as to minimize contact with the adhesive. The polymer material employed in the present invention can be a polymer powder, a liquified polymer or a two part adhesive mixture which reacts to form a thermoset polymer product.

19 Claims, 3 Drawing Sheets

METHOD FOR FORMING A POLYMERIC PLASTIC PRODUCT HAVING A HARD WEAR-RESISTANT SURFACE

BACKGROUND OF THE INVENTION

The present invention relates to a process for the impregnation of a plastic product and particularly a polymer plastic product with a surface comprising a hard wear-resistant material.

A number of techniques are known for attempting to provide improved wear-resistance to a polymer plastic product. However, these techniques involve mixing the polymer with hard phases and using such a mixture to form a composite which has the hard phases present throughout its volume.

Thus the need still exists for a method for providing hard phases at those points of the product most required to resist wear as well as strengthen or reinforce these materials, i.e., the surface of the product.

A wide variety of techniques are known for the impregnation of metals e.g., iron with hard wear-resistant surfaces, e.g., carbides. For example, carbide particles can be placed in a mold in molten iron then cast as discussed for example, in U.S. Pat. No. 4,119,459 to Ekmar et al. In addition, certain cast on hard surfacing techniques for use with polystyrene patterns are also recognized in the art. See, for example, the discussion in Hanson et al, "Application of Cast-on Ferrochrome Based Hard Surfacing to Polystyrene Pattern Castings", Bureau of Mine reports of investigations 8942, U.S. Department of the Interior, 1985.

The inventor of the present invention has also been heavily involved in the invention of other processes which attempt to more effectively impregnate the surface of a metal, e.g., iron, with carbides during the casting process. For example, attention is directed towards U.S. Pat. No. 5,027,878 which relates to the carbide impregnation of cast iron using evaporative pattern castings (EPC) as well as U.S. application Ser. Nos. 564,184 and 564,185 which relate to the impregnation of cast iron and aluminum alloy castings with carbides using sand cores.

However, such techniques have not previously been employed with polymer plastic materials.

SUMMARY OF THE INVENTION

In one aspect of the present invention, there is disclosed a method for impregnating a polymer plastic product with a hard wear-resistant material surface layer in which the carbide particles can be present in either a regular or an irregular, or random, pattern.

In particular, the present invention relates to a method for impregnating a plastic product with a hard wear-resistant material surface layer comprising:

(a) providing a steel plate having a desired shape and further having an adhesive layer on at least a portion thereof;

(b) introducing a plurality of particles comprising a hard wear-resistant material onto the adhesive layer;

(c) curing the adhesive so as to anchor the particles onto the steel plate;

(d) placing the steel plate into a mold cavity;

(e) introducing a polymer material into the cavity;

(f) exposing the sheet and polymer to conditions effective to provide a polymer product having a hard wear-resistant material surface layer therein; and (g) cooling the mold and removing the steel sheet therefrom.

In one embodiment of this invention, the method further comprises providing a regular pattern of particles in the product. This can be accomplished when (b) comprises:

providing a mesh plate having a desired pattern of holes set for predetermined size of wear-resistant particles;

spreading particles onto the mesh plate so as to provide a particle substantially in each of all the holes; and transferring the pattern of particles from the mesh plate onto the adhesive layer so as to minimize contact with the adhesive.

In another aspect, the present invention relates to the products produced by these methods.

DETAILED DESCRIPTION OF THE PREFERRED EMBODIMENTS

Figure 1A:
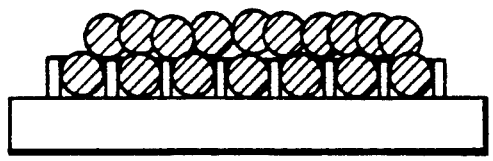
FIG. 1 illustrates a technique for forming a particle pattern according to the present invention.

The present invention can be employed for the production of a wear-resistant material layer within any type of polymer material recognized in the art with thermoplastic or thermoset polymer material being preferred. For example, certain preferred polymers include high molecular weight polyethylene or polyurethane materials or other similar polymers. These polymer materials can be employed in any form recognized in the art, e.g., as a polymer powder, a liquified polymer (at higher temperatures), or a two part adhesive mixture which reacts to form a thermoset polymer product.

In the present invention, larger particles of the hard wear-resistant material having a spherical shape are preferably employed, i.e., those particles having a diameter from about 2 mm or more. More preferably, the particle diameter employed within the present invention is from about 2 to about 3 mm. Furthermore, the diameters of all the particles in a given bulk are preferably within about 0.5 mm of the median size. However, it is also apparent that the use of particles having different sizes can be employed in order to produce layers having a controlled, desired thickness at various points on the final product.

Although the particles preferably are substantially spherical due to practical considerations, the shape is not particularly critical to the present invention. Thus, for example, fine angular hard phase powder can be used to produce wear-resistant surface.

As to the choice of hard wear-resistant material, the present invention can effectively employ any of the hard phases which are traditionally employed in the art, such as tungsten carbide, chromium carbide, and the like, or mixtures thereof. Furthermore, this material can include a metallic binder, such as those in the iron group, preferably cobalt for use with tungsten carbide, or nickel for use with chromium carbide, and the like, which may be necessary to produce the preferred spherical shapes.

In the process of the present invention, the particles are attached to a support plate, e.g., a steel plate, having a suitable thickness, e.g., 1/16-⅛ thick. The particles can be attached by means of an adhesive, preferably, a high temperature inorganic adhesive which is more effective in preventing the premature release of the carbides from the plate.

By high temperature, it is meant that the adhesive has a melting point higher than the polymer glass temperature. Any suitable adhesive can be employed in the present invention. In the preferred embodiment, the adhesive comprises AREMCO's Cermabond 569, which is a proprietary product of AREMCO. Examples of other adhesives which can be used include AREMCO 516, polyvinyl alcohol, etc.

An adhesive layer is applied onto the steel sheet at those locations where the wear-resistant layer is to be provided. The adhesive layer can be applied onto the steel sheet by any suitable means, e.g., painting or spraying. Moreover, the adhesive layer preferably has a thickness of at least 0.1 mm, more preferably about 0.1 to about 0.5 mm, still more preferably, 0.2 to 0.5 mm.

The hard wear-resistant material particles can either be randomly spread onto the adhesive layer which provides an irregular or random pattern of the particles as, e.g., in the case of fine angular particles or, in the alternative, a regular pattern of particles can be provided as, e.g., in the case of spherical large particles.

In providing a regular pattern of spherical particles, a mesh plate, e.g., a sheet having a desired pattern of holes, is employed. Preferably, the mesh plate has a hexagonal pattern of holes in order to provide the optimal packed arrangement. Moreover, the mesh plate thickness is preferably selected to be less than the median particle diameter, more preferably between ½ and about ⅔ of the median particle diameter so that the particles protrude slightly above the mesh plate. This mesh plate can be provided by any suitable means, e.g., drilling holes, in a steel or a plastic (e.g., a polycarbonate) sheet, having the desired thickness.

Figure 1B:
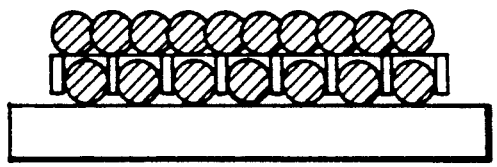
Figure 1C:
Figure 1D:
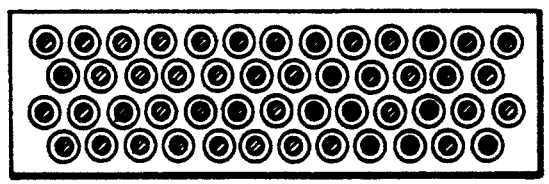

After the mesh plate is placed on a flat surface of a plate, e.g., a steel plate or the like, the particles are then spread on the mesh plate and the excess particles are removed. See, for example, FIG. 1(a). This removal can be accomplished by any satisfactory method, for example, by raising the mesh plate to a height approximately equal to the particle radius and scraping of the excess particles. See, for example, FIG. 1(b). The mesh plate can then be lowered onto the flat surface of the plate so that the top of the particles would protrude above the top surface of the mesh plate, thus, forming a geometric pattern of particle distribution. See, for example, FIGS. 1(c) and (d).

This pattern of particles can then be transferred onto the steel sheet by a variety of techniques. In one embodiment, an adhesive tape is placed on the particle pattern. When the adhesive tape is removed, the geometric pattern of particles is effectively transferred to the tape. See, for example, FIG. 2.

The tape which can be employed in the present invention includes any tape which is strong enough to hold heavy, i.e., high density, carbides firmly in place and yet weak enough to release the particles when the tape is lifted off the carbide strip after curing of the adhesive. Examples of such tapes include 3M 404 type high tack tape, and 3M 9415 or Y928 low tack tapes.

The tape is then placed on the adhesive layer on the steel plate so that the wear-resistant carbide particles make minimum contact with the adhesive. The tape may be moved without disturbing the particle arrangement or increasing the adhesive/particle contact area until the adhesive has cured. This freedom allows precise location of the tape onto the steel plate. Hot air may be blown for a sufficient period of time, e.g., 35 seconds onto the tape in order to allow the adhesive to be sufficiently dry to hold it in place, and to allow handling the steel plate without disturbing particle arrangements. After the particles are transferred, the adhesive is cured. If for example, AREMCO's Ceramabond 569 is employed as adhesive, this curing can occur at room temperature in 8-12 hours. When the adhesive is cured, the tape can be removed leaving a pattern of particles firmly anchored onto the steel plate surface.

The above arrangement allows for the minimum contact between the particle and steel sheet, and in particular, a single point contact between the particle and the adhesive layer during binding to the steel plate. Moreover, the particles are uniformly distributed on the plate, i.e., without near neighbor contact to allow easy flow of, e.g., polymer powder around each particle and form a good quality composite.

At this point in either embodiment, the steel plate with the particle arrangement is placed in a suitable die cavity for providing a polymer product.

For example, the steel sheet can be placed in a die with the particles facing upwards. A polymer powder of a suitable type, e.g., ultra high molecular weight polyethylene (UHMWPE) or polyurethane may be introduced into the die, the die heated to a suitable temperature at which the polymer reaches the glass temperature and pressure applied so as to "squeeze" the polymer through the carbide arrangement. Typical process parameters for preparing a 4.0-5.0 million molecular weight UHMWPE carbide impregnated sheet are Pressure: 1000 psi
Temperature: 385° F.
Time to Heat Mold: 45 minutes
Time to Cool Mold: 30 minutes In another embodiment, a liquified polymer, e.g., polyurethane heated to temperatures above the glass temperature, may be poured into the mold cavity and allowed to cool. In yet another embodiment, an adhesive mixture maybe introduced into the mold cavity and allowed to react to form a thermosetting polymer product such as epoxy.

The method according to the present invention can be used to make polymer products which have a wide variety of applications. Moreover, this process is capable of producing a wear-resistant surface at a point where it is most needed, i.e., at the surface of the polymer product.

Furthermore, such an arrangement will also add abrasion resistance to the polymers or increase surface friction coefficient of polymers and thus increase the polymer application field by a considerable degree.

The ease of use associated with the present invention provides for great flexibility, i.e., layers of required thickness can be provided without difficulty by simply varying the particle diameter.

Similarly, the use of adhesive tapes allows for a regular pattern of the particles to be employed with curved or complex surfaces of the polymer product. Furthermore, this regular particle pattern arrangement can be produced with uniform hard phase thickness over a whole or part of the composite surface and with uniform tribological and other above mentioned characteristics.

In order to further illustrate the present invention and the advantages associated therewith, the following specific example is given, it being understood that same is intended only as illustrative and in nowise limitive.

EXAMPLE

A wear-resistant powder consisting of 2-3 mm spherical particles whose diameters do not vary from the median diameter by more than 0.5 mm is spread onto a mesh plate with a hexagonal pattern of holes where the plate thickness is selected to be between ⅓ and ¾ the median particle diameter. Excess particles are struck off thus leaving one particle in each mesh hole, see FIG. 1.

Figure 2:
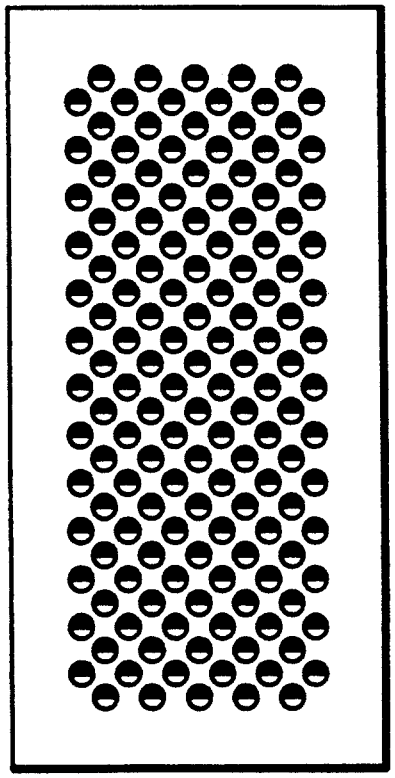
FIG. 2 illustrates an adhesive tape containing a close packed arrangement of tungsten carbide spheres.

An adhesive tape is placed on the particle layer to pick up the particle layer while maintaining the mesh pattern, see FIG. 2.

A steel plate which is 1.5-2.0 mm thick has an adhesive layer of Aremco 569 with a thickness of approximately 0.1 to 0.25 mm thickness applied thereon. The tape is placed on the adhesive layer so that carbide particles make nearly "single point" contact with the adhesive. The adhesive is cured for 8 hours at 50° C. and the tape peeled off.

The steel sheet with carbide arrangement is then placed in a die with particles facing upwards. Polymer powder comprising ultra high molecular weight polyethylene is poured into the die and the die is heated to 385° F. so that the polymer reaches the glass temperature, 1000 psi pressure is applied to squeeze the polymer through the carbide arrangement and thus prepare a 4.0-4.5 million molecular weight UHMWPE carbide impregnated sheet.

Figure 3:
FIGS. 3-6 illustrate a variety of plastic products having a hard wear-resistant layer impregnated therein.
Figure 4:
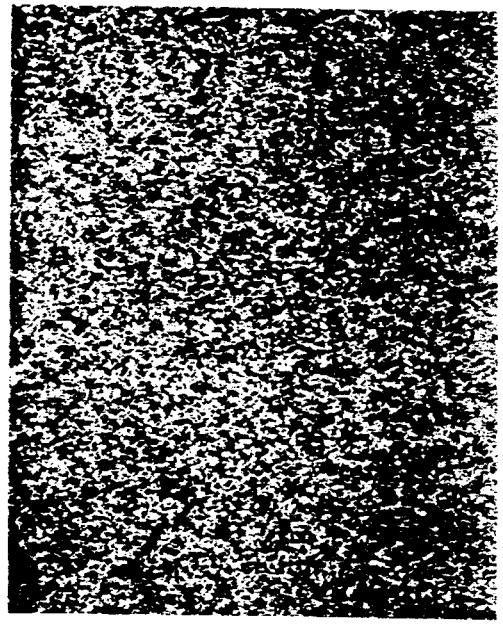
Figure 5:
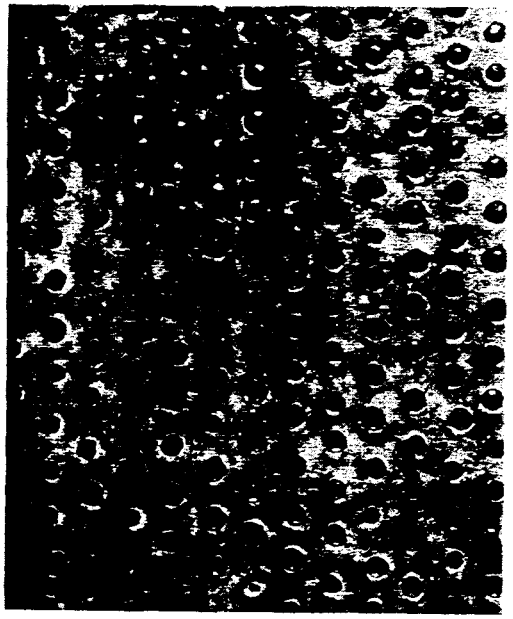
Figure 6:

The mold is cooled for 30 minutes and the final product removed as illustrated by FIG. 3.

What is claimed is:

1. A method for impregnating a plastic product with a hard wear-resistant material surface layer comprising:
    (a) providing a support sheet having a desired shape and further having an adhesive layer on at least a portion thereof;
    (b) introducing a plurality of particles comprising a hard wear-resistant material onto the adhesive layer;
    (c) curing the adhesive so as to anchor the particles onto the support plate;
    (d) placing the support sheet into a mold cavity;
    (e) introducing a polymer material into the cavity;
    (f) exposing the sheet and polymer material to conditions effective to provide a polymer product having a hard wear-resistant material surface layer therein;
    (g) cooling the mold and removing the support sheet therefrom.

2. A method according to claim 1 wherein the polymer product is finished by grinding.

3. The method according to claim 1 wherein (b) comprises:
    providing a mesh plate having a desired pattern of holes set for predetermined size of wear-resistant particles;
    spreading the particles onto the mesh plate so as to provide a particle in substantially all of the holes; and
    transferring the pattern of particles onto the adhesive layer so as to minimize contact with the adhesive.

4. The method according to claim 3 wherein the particles are transferred through the use of an adhesive tape which is placed on the mesh plate after the particles have been spread thereon in order to transfer the pattern of particles to the tape and then placing the tape upon the adhesive layer and removing the tape after the adhesive has been cured.

5. The method according to claim 3 wherein the mesh plate thickness is between about ⅓ and about ¾ of the median diameter of the particles.

6. The method according to claim 1 wherein the support sheet is a steel sheet, the mold cavity is a die, the polymer material is a polymer powder which is introduced into the die; and the effective conditions of (f) involve application of heat and pressure so as to form a polymer product.

7. The method according to claim 6 wherein the powder comprises ultra high molecular weight polyethylene or polyurethane.

8. The method according to claim 7 wherein the pressure is about 1000 psi and the temperature is about 385° F.

9. The method according to claim 1 wherein the support sheet is a steel sheet, the polymer material is a liquified polymer which is poured into the mold cavity and the effective conditions of (f) comprise providing sufficient time for the cooling of the liquid polymer.

10. The method of claim 9 wherein the polymer is liquified by application of heat.

11. The method according to claim 1 wherein the support sheet is a steel sheet, the polymer material is a two part adhesive mixture which is introduced into the mold cavity and the effective conditions of (f) are those effective to react the adhesive mixture so as to form a thermoset polymer product.

12. The method according to claim 11 wherein the adhesive mixture forms an epoxy.

13. The method according to claim 1 wherein the wear-resistant particles are spherical particles having a mean diameter of at least about 2 mm.

14. The method according to claim 13 wherein the particles have a mean diameter of about 2 to 3 mm.

15. The method according to claim 13 wherein the diameters of each of the particles are within about 0.5 mm of the median diameter.

16. The method according to claim 1 wherein the wear-resistant material is tungsten carbide or chromium carbide or alumina ceramic.

17. The method according to claim 1 wherein the adhesive comprises a high temperature inorganic adhesive.

18. The method according to claim 3 wherein the support sheet is a steel sheet, mold cavity is a die, the polymer material is a polymer powder comprising ultra high molecular weight polyethylene or polyurethane and which is introduced into the dye; the effective conditions of (f) involve application of heat and pressure so as to form a polymer product.

19. The method according to claim 18 wherein the wear-resistant particles are spherical particles having a mean diameter of at least about 2 mm and further wherein the diameters of each of the particles are within about 0.5 mm of the median diameter.

* * * * *